United States Patent
Yochai et al.

(10) Patent No.: US 9,229,812 B2
(45) Date of Patent: Jan. 5, 2016

(54) LAYERED FAILURE PROTECTION SCHEME FOR PROTECTING DESTAGED DATA UNITS

(71) Applicant: Infinidat LTD.

(72) Inventors: Yechiel Yochai, Moshav Aviel (IL); Ido Ben-Tsion, Ness-Ziona (IL)

(73) Assignee: INFINIDAT LTD., Herzliya (IL)

( * ) Notice: Subject to any disclaimer, the term of this patent is extended or adjusted under 35 U.S.C. 154(b) by 101 days.

(21) Appl. No.: 14/176,163

(22) Filed: Feb. 10, 2014

(65) Prior Publication Data
US 2015/0227422 A1 Aug. 13, 2015

(51) Int. Cl.
G11C 29/00 (2006.01)
G06F 11/10 (2006.01)

(52) U.S. Cl.
CPC ........ *G06F 11/1076* (2013.01); *G06F 11/1096* (2013.01)

(58) Field of Classification Search
None
See application file for complete search history.

(56) References Cited

U.S. PATENT DOCUMENTS

| | | | | |
|---|---|---|---|---|
| 5,734,814 A | * | 3/1998 | Corbin et al. | 714/6.22 |
| 6,219,753 B1 | * | 4/2001 | Richardson | 711/114 |
| 6,701,452 B1 | * | 3/2004 | Kinjo et al. | 714/6.21 |
| 8,495,295 B2 | * | 7/2013 | Kopylovitz | 711/114 |
| 8,839,026 B2 | * | 9/2014 | Kopylovitz | 714/6.2 |
| 2010/0153638 A1 | * | 6/2010 | Yochai et al. | 711/113 |
| 2011/0202723 A1 | * | 8/2011 | Yochai et al. | 711/114 |

* cited by examiner

*Primary Examiner* — Daniel McMahon
(74) *Attorney, Agent, or Firm* — Reches Patents (57) ABSTRACT

A method that includes calculating multiple set parity units for multiple sets of data units that are cached in a storage system thereby providing a group of units that includes multiple sets of units. Each set of units includes a set of data units and at least one associated set parity unit that facilitate a reconstruction of the set of units when a first number of units of the set of units is lost. Calculating at least one group parity unit for the group of units. A combination of the at least one group parity unit and at least one associated set parity unit facilitate a reconstruction of the set of units upon a failure of a second number of units of the set of units. The second number of units of the set of units exceeds the first number of units of the set of units. Destaging the group of units and the at least one group parity unit to multiple disks of the storage system.

25 Claims, 5 Drawing Sheets

FIG. 1

Calculating multiple set parity units for multiple sets of data units that are cached in a cache memory of a storage system thereby providing multiple sets of units; wherein each set of units comprises a set of data units and at least one associated set parity unit; wherein the at least one associated set parity unit facilitates a reconstruction of the set of units when a first number of units of the set of units is lost. The multiple sets of units form a group of units. 210 calculating at least one group parity unit for the group of units. A combination of the at least one group parity unit and at least associated set parity unit of a set of units facilitate a reconstruction of the set of units upon a failure of a second number of units of the set of units. The second number exceeds the first number. 220

Destaging the group of units and the at least one group parity units to multiple disks of the storage system. 230

Receiving an indication of at least one failed disk of the multiple disks. 240

Searching for affected set of units. An affected set of units includes at least one lost unit that was stored in a failed disk of the at least one failed disk of the multiple disks. 250

Reconstructing each affected set of units in response to a number of lost units of the affected set of units. The reconstructing comprises using at least one of (a) any non-lost set parity unit of the affected set of units and (b) any non-lost group parity unit 260

Reconstructing the affected set of units using any non-lost set parity unit of the affected set of units if a number of lost units of the affected set of units does not exceed the first number. 262

Reconstructing the affected set of units using any non-lost group parity unit and any non-lost set parity unit associated with the affected set of units 264

LAYERED FAILURE PROTECTION SCHEME FOR PROTECTING DESTAGED DATA UNITS

BACKGROUND

A disk storage or disc storage is a general category of storage mechanisms, in which data are digitally recorded by various electronic, magnetic, optical, or mechanical methods on a surface layer deposited of one or more planar, round and rotating disks (or discs) (also referred to as the media).

A disk (also referred to as a disk drive) is a device implementing such a storage mechanism with fixed or removable media; with removable media the device is usually distinguished from the media as in compact disc drive and the compact disc.

Notable types are the hard disk drives (HDD) containing a non-removable disk, the floppy disk drive (FDD) and its removable floppy disk, and various optical disc drives and associated optical disc media (www.wikipedia.org).

Storage systems are generally expected to tolerate at least two concurrent disk failures without data loss. Since the capacity of disks keeps growing immensely, the chances for data loss increase dramatically. When taking into account the longer time it takes for a storage system to rebuild a failed disk of an increased size and the chances to deal with a second failure during the longer rebuild time, it is estimated that the chances for data loss in a storage system increases by the square of the size growth of the disks. Hence, storage systems should be capable of handling more than two concurrent disk failures.

Since the number of tolerated failures dictates the number of parity units need to be calculated, the more disk failures the system is expected to deal with, the greater is the overhead wasted on parity information, on the expense of user data. For example, for three tolerated disk failures for a redundant array of independent (RAID) stripe that includes 12 data units, the overhead of the three parity units need to be added to the 12 data units is 20% and for 2 tolerated disk failures, the required two parity units impose an overhead of 14% of the 12+2 data and parity units.

In order to reduce the overhead imposed by storing multiple parities for a certain amount of data units in a stripe, the amount of data units in the stripe needs to be increased. For example, instead of composing stripes of 12+3 data and parity units, the stripe can be constructed of e.g. 60+5 data and parity units, which wastes 7.7% of the total storage space, instead of 20% wasted in the case of 12+3 unit stripes. However, in such a configuration, each disk rebuild, even of a single disk failure, requires reading an excessive amount of data. In the aforementioned example, 65 data and parity units need to be processed upon recovering each lost data unit from a single disk failure (comparing to 15 units in the case of using the smaller stripe), which complicates the reconstruction, lengthen the reconstruction time and increases chances for a second failure while reconstructing.

There is a need for increasing the amount of parities for supporting more concurrent disk failures, while improving a reconstruction of a single disk failure and reducing the parity overhead.

SUMMARY

According to an embodiment of the invention various methods may be provided and are described in the specification. According to various embodiments of the invention there may be provided a non-transitory computer readable medium that may store instructions for performing any of the methods described in the specification and any steps thereof, including any combinations of same. Additional embodiments of the invention include a storage system arranged to execute any or all of the methods described in the specification above, including any stages—and any combinations of same.

According to an embodiment of the invention there may be provided a method for disk failure protection, the method may include calculating multiple set parity units for multiple sets of data units that are cached in a cache memory of a storage system thereby providing multiple sets of units; wherein each set of units may include a set of data units and at least one associated set parity unit; wherein the at least one associated set parity unit facilitates a reconstruction of the set of units when a first number of units of the set of units is lost; calculating at least one group parity unit for the group of units; wherein a combination of the at least one group parity unit and at least associated set parity unit of a set of units facilitate a reconstruction of the set of units upon a failure of a second number of units of the set of units; wherein the second number exceeds the first number; and destaging the group of units and the at least one group parity unit to multiple disks of the storage system.

The at least one group parity unit may include (N2-1) group parity units and wherein N2 equals the second number.

The method may include receiving an indication of at least one failed disk of the multiple disks; searching for an affected set of units, wherein an affected set of units may include at least one lost unit that was stored in a failed disk of the at least one failed disk of the multiple disks; and reconstructing the affected set of units in response to a number of lost units of the affected set of units.

The reconstructing of the affected set of units may include using at least one of (a) any non-lost set parity unit of the affected set of units and (b) any non-lost group parity unit.

The reconstructing of the affected set of units may include processing either one of (a) all non-lost units of the affected set of units and (b) all non-lost units of the group of units.

The method may include reconstructing the affected set of units using any non-lost set parity unit of the affected set of units if a number of lost units of the affected set of units does not exceed the first number; and reconstructing the affected set of units using any non-lost group parity unit and any non-lost set parity unit associated with the affected set of units if the number of lost units of the affected set of units exceeds the first number and does not exceed the second number.

The method may include reconstructing the affected set of units by processing all non-lost units of the affected set of units if a number of lost units of the affected set of units does not exceed the first number; and reconstructing the affected set of units by processing all non-lost units of the group of units if the number of lost units of the affected set of units exceeds the first number and does not exceed the second number.

The destaging may include storing up to a single unit of the group of units per disk.

According to an embodiment of the invention there may be provided a non-transitory computer readable medium may store instructions that once executed by a computer cause the computer to perform the stages of calculating multiple set parity units for multiple sets of data units that are cached in a cache memory of a storage system thereby providing multiple sets of units; wherein each set of units may include a set of data units and at least one associated set parity unit; wherein the at least one associated set parity unit facilitates a reconstruction of the set of units when a first number of units of the set of units is lost; calculating at least one group parity unit for the group of units; wherein a combination of the at least one group parity unit and at least associated set parity unit of a set of units facilitate a reconstruction of the set of units upon a failure of a second number of units of the set of units; and destaging the group of units and the at least one group parity unit to multiple disks of the storage system.

The at least one group parity units may include (N2-1) group parity units and wherein N2 equals the second number.

The non-transitory computer readable medium may store instructions for receiving an indication of at least one failed disk of the multiple disks; searching for an affected set of units, wherein an affected set of units may include at least one lost unit that was stored in a failed disk of the at least one failed disk of the multiple disks; and reconstructing the affected set of units in response to a number of lost units of the affected set of units.

The reconstructing of the affected set of units may include using at least one of (a) any non-lost set parity unit of the affected set of units and (b) any non-lost group parity unit.

The reconstructing of the affected set of units may include processing either one of (a) all non-lost units of the affected set of units and (b) all non-lost units of the group of units.

The non-transitory computer readable medium may store instructions for reconstructing the affected set of units using any non-lost set parity unit of the affected set of units if a number of lost units of the affected set of units does not exceed the first number; and reconstructing the affected set of units using any non-lost group parity unit and any non-lost set parity unit associated with the affected set of units if the number of lost units of the affected set of units exceeds the first number and does not exceed the second number.

The non-transitory computer readable medium may store instructions for reconstructing the affected set of units by processing all non-lost units of the affected set of units if a number of lost units of the affected set of units does not exceed the first number; and reconstructing the affected set of units by processing all non-lost units of the group of units if the number of lost units of the affected set of units exceeds the first number and does not exceed the second number.

The destaging may include storing up to a single unit of the group of units per disk.

According to an embodiment of the invention there may be provided a storage system that may include a failure recovery unit and a storage system controller; wherein the failure recovery unit may be arranged to calculate multiple set parity units for multiple sets of data units that are cached in a cache memory of a storage system thereby providing multiple sets of units; wherein each set of units may include a set of data units and at least one associated set parity unit; wherein the at least one associated set parity unit facilitates a reconstruction of the set of units when a first number of units of the set of units is lost; and calculate at least one group parity unit for the group of units; wherein a combination of the at least one group parity unit and at least associated set parity unit of a set of units facilitate a reconstruction of the set of units upon a failure of a second number of units of the set of units; and wherein the storage system controller may be arranged to destage the group of units and the at least one group parity units to multiple disks of the storage system.

The at least one group parity units may include (N−) group parity units and wherein N equals the second number.

The failure recovery unit may be arranged to receive an indication of at least one failed disk of the multiple disks; search for an affected set of units, wherein an affected set of units may include at least one lost unit that was stored in a failed disk of the at least one failed disk of the multiple disks; and reconstruct the affected set of units in response to a number of lost units of the affected set of units.

The reconstruction of the affected set of units may include using at least one of (a) any non-lost set parity unit of the affected set of units and (b) any non-lost group parity unit.

The reconstruction of the affected set of units may include processing either one of (a) all non-lost units of the affected set of units and (b) all non-lost units of the group of units.

The failure recovery unit may be arranged to reconstruct the affected set of units using any non-lost set parity unit of the affected set of units if a number of lost units of the affected set of units does not exceed the first number; and reconstruct the affected set of units using any non-lost group parity unit and any non-lost set parity unit associated with the affected set of units if the number of lost units of the affected set of units exceeds the first number and does not exceed the second number.

The failure recovery unit may be arranged to reconstruct the affected set of units by processing all non-lost units of the affected set of units if a number of lost units of the affected set of units does not exceed the first number; and reconstruct the affected set of units by processing all non-lost units of the group of units if the number of lost units of the affected set of units exceeds the first number and does not exceed the second number.

The failure recovery system wherein the destaging may include storing up to a single unit of the group of units per disk.

According to an embodiment of the invention there may be provided a method for disk failure protection, the method may include calculating multiple layers of parity units for multiple layers of data units; wherein each layer of parity units and an associated layer of data units form a failure protection layer; wherein different layers of parity units exhibit different protection levels thereby protect, in conjunction with parity units of lower layers affected by a failure, against different numbers of failed data units; wherein data units of a certain layer of data units that is associated with a certain protection level are included in each layer of data units that is associated with a protection level that is higher than the certain protection level; and destaging the units of the multiple layers of parity units and of the multiple layers of data units to multiple disks of a storage system.

The method may include receiving an indication of at least one failed disk of the multiple disks; searching for affected failure protection layers, wherein an affected failure protection layer may include at least one lost unit that was stored in a failed disk of the multiple disks; and reconstructing each affected failure protection layer in response to a number of lost units of the affected failure protection layer; wherein the reconstructing may include using at least one layer of parity units.

The method may include selecting a selected layer of parity units to be used for reconstructing the affected failure protection layer in response to the number of lost units of the affected failure protection layers.

The selected layer of parity units may have a lowest protection level out of protection levels of all layers of parity units that facilitate a reconstruction of the number of lost units of the affected failure protection layer.

The method may include searching for affected failure protection layers of a lowest protection level.

According to an embodiment of the invention there may be provided a non-transitory computer readable medium may store instructions for calculating multiple layers of parity units for multiple layers of data units; wherein each layer of parity units and an associated layer of data units form a failure protection layer; wherein different layers of parity units exhibit different protection levels thereby protect, in conjunction with parity units of lower layers affected by a failure, against different numbers of failed data units; wherein data units of a certain layer of data units that is associated with a certain protection level are included in each layer of data units that is associated with a protection level that is higher than the certain protection level; and destaging the units of the multiple layers of parity units and of the multiple layers of data units to multiple disks of a storage system.

The non-transitory computer readable medium may store instructions for receiving an indication of at least one failed disk of the multiple disks; searching for affected failure protection layers, wherein an affected failure protection layer may include at least one lost unit that was stored in a failed disk of the multiple disks; and reconstructing each affected failure protection layer in response to a number of lost units of the affected failure protection layer; wherein the reconstructing may include using at least one layer of parity units.

The non-transitory computer readable medium may store instructions for selecting a selected layer of parity units to be used for reconstructing the affected failure protection layer in response to the number of lost units of the affected failure protection layers.

The selected layer of parity units may have a lowest protection level out of protection levels of all layers of parity units that facilitate a reconstruction of the number of lost units of the affected failure protection layer.

The non-transitory computer readable medium may store instructions for searching for affected failure protection layers of a lowest protection level.

According to an embodiment of the invention there may be provided a storage system that may include a failure recovery unit and a storage system controller; wherein the failure recovery unit may be arranged to calculate multiple layers of parity units for multiple layers of data units; wherein each layer of parity units and an associated layer of data units form a failure protection layer; wherein different layers of parity units exhibit different protection levels thereby protect, in conjunction with parity units of lower layers affected by a failure, against different numbers of failed data units; wherein data units of a certain layer of data units that is associated with a certain protection level are included in each layer of data units that is associated with a protection level that is higher than the certain protection level. Wherein the storage system controller may be arranged to destage the units of the multiple layers of parity units and of the multiple layers of data units to multiple disks of the storage system.

The failure recovery unit may be arranged to receive an indication of at least one failed disk of the multiple disks; search for affected failure protection layers, wherein an affected failure protection layer may include at least one lost unit that was stored in a failed disk of the multiple disks; and wherein the failure recovery unit may be arranged to reconstruct each affected failure protection layer in response to a number of lost units of the affected failure protection layer; wherein the reconstructing may include using at least one layer of parity units.

The failure recovery unit may be arranged to select a selected layer of parity units to be used for reconstructing the affected failure protection layer in response to the number of lost units of the affected failure protection layers.

The selected layer of parity units may have a lowest protection level out of protection levels of all layers of parity units that facilitate a reconstruction of the number of lost units of the affected failure protection layer.

The failure recovery unit may be arranged to search for affected failure protection layers of a lowest protection level.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 illustrates a method according to an embodiment of the invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Parity units are calculated by processing data units. The data unit is a basic unit handled by the storage system and may be a block, a plurality of storage blocks, a section, a plurality of sections, etc. The parity units may be of a same size as the data units but may differ by size. The term "unit" may refer to a parity unit or a data unit.

A set of data units and one or more parity units associated with the set of data units (calculated by processing the set of data units) may form a set of units.

Disks that store the set of units are referred to a set of disks.

Multiple sets of units (data units and parity units) form a group of units. The group of units is processed when calculating the parity units of the group of units. A parity unit of a group of units is referred to as a group parity unit. A parity unit of a set of data units is referred to as a set parity unit.

A lost unit is a unit that cannot be accessed due to a failure of the disk or parts of the disk that stores the lost unit. A lost unit can be of corrupted data or can be inaccessible.

In the following explanation it is assumed that different units of a single set of units are distributed over multiple disks so that up to a single unit of a set of units is stored per disk. It is further assumed that different units of a group of units are distributed over multiple disks so that up to a single unit of a group of units is stored per disk. Accordingly, under such an assumption, any reference made to a disk may be interpreted as referring to a unit of a set or group of units. Any reference to a failed disk may be interpreted as referring to a lost unit stored in that failed disk.

According to an embodiment of the invention there is provided a layered failure protection scheme that may calculate set parity units (for example one or more set parity units) for a set of N data units (for example N=15) and calculates one or more group parity units (for example M (>=1)) for a group of units that includes multiple (K) sets of units (including data and parity units).

The group of units may include, for example K=four sets of data units (total of sixty data units) and their set parity units (total of four parity units, one per each set), K=six sets of data units (total of ninety data units) and their set parity units (total of six), etc.

Each set of N data units and their corresponding set parity unit may be stored in a set of (N+1) disks.

A group of units and any group parity unit may be stored in a group of disks.

The total number of parity units may be K+M, one set parity unit for each set of data units and M group parity units for the entire group of units. The number of supported failures is at least M+1 failed disks (at least M+1 lost units), in the worst case scenario when all the M+1 failures occur in the same set of units (same set of disks).

For example, in a case where the group of data units includes four sets of data units, fifteen data units included in each set of data units, and a protection that tolerates two concurrent failed disks, then the group of data units should be stored in sixty disks and the total number of parity units (and hence the total number of disks required for storing parity units associated with the group of data units) is five—one set parity unit for each set of fifteen data units and an additional group parity unit for the group of units.

Upon a write request, a set of fifteen data units are processed (by applying a mathematical function such as but not limited to a XOR function) for calculating the set parity unit of the set that includes the data unit to be written. In addition, the sixty data units and four parity units that form the group of units are processed to provide the group parity unit of the group of units.

When using write-anywhere technique, also known as write-out-of-place technique, where the sets of data units include data units that are stored in the cache, there is no need to read all the sixty data units from the disks, prior to calculating the set parity units.

The destage includes writing the multiple sets of data units (sixty data units) and five parity units to a group of sixty five different disks. These sixty five disks include four sets of disks—each set includes sixteen disks (fifteen disks for storing data units of a set and an additional disk for storing the set parity unit), and an additional disk for storing the group parity unit.

Upon rebuilding a single failed disk in a set of disks (a single lost data unit in a set of units), in order to recover a certain lost unit that was stored in the failed disk, only the non-failed fifteen units of the set (fifteen data units and their parity unit) are processed for recovering the lost unit of the set of units. This is a simple process that includes reading only N (fifteen) units from fifteen disks and applying a simple calculation, for example a simple XOR on the N non-failed units. This process can be repeated for each lost unit that was stored in the failed disk.

Upon multiple failures of disks that store the group of units, where each failed disk belongs to a different set of disks, multiple rebuild processes are handled independently from each other, one simple rebuild process per each failed set of disks (set of units), as described above for rebuilding a single failed disk.

Only upon a failure of more than one disk in the same set of disks, there is a need to apply a more complicated rebuilding process that includes reading all the non-failed units of the group of units, and applying a more complex recovery process that can overcome the failure of two (or more) disks of the group of disks. This rebuild may use a more complex scheme, for example, Reed-Solomon or any other calculation known for recovering data of multiple failed disks.

Figure 1:
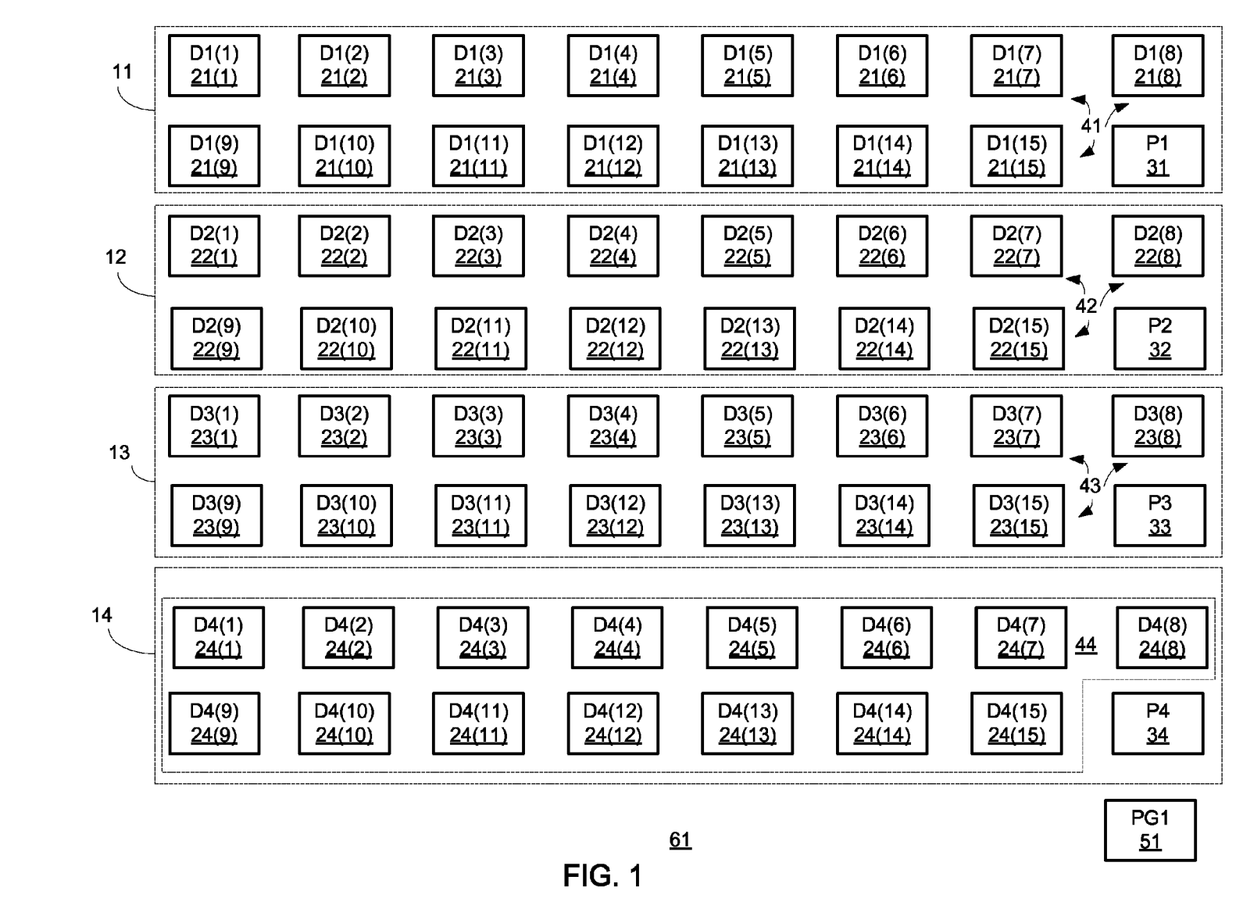
FIG. 1 illustrates various data structures according to an embodiment of the invention.

FIG. 1 illustrates a group 61 of units according to an embodiment of the invention.

Group 61 of units includes four sets 11, 12, 13, 14 and first group parity unit PG 51. Each set includes fifteen data units and a set parity unit.

Set 11 includes fifteen data units D1(1)—D1(15) 21(1)-21(15) and first set parity unit P1 31. Set 12 includes fifteen data units D2(1) D2(15) 22(1)-22(15) and second set parity unit P2 32. Set 13 includes fifteen data units D3(1)—D3(15) 23(1)-23(15) and third set parity unit P3 33. Set 14 includes fifteen data units D4(1)—D4(15) 24(1)-24(15) and fourth set parity unit P4 34. The data units of each set (11, 12, 13 and 14) form sets of data units 41, 42, 43 and 44 respectively.

The sixty five units of group 61 are stored in a group of sixty five disks.

If, due to one or more disk failures, up to a single unit is lost per set (11, 12, 13 and 14) then the recovery of such a set includes retrieving the fifteen non-lost units and reconstructing the lost unit of the set.

If, due to one or more disk failures, two units are lost in a certain set (out of 11, 12, 13 and 14) then the recovery of that certain set includes retrieving all the non-failed units of the group 61 and reconstructing the two lost units.

Although only one group parity unit is illustrated in FIG. 1 and one set parity unit per set is illustrated, multiple group parity units may be calculated and stored for the group and more than one set parity unit may be calculated and stored for each set or for specific sets. According to embodiments of the invention, in case a protection of M+1 concurrent disk failures per a set of units is required, M group parity units are calculated and stored for the group and a single set parity unit is calculated and stored per set.

FIG. 2 illustrates method 200 for disk failure protection, according to an embodiment of the invention.

Method 200 may start by stages 210 and 220.

Stage 210 may include calculating multiple set parity units for multiple sets of data units that are cached in a cache memory of a storage system thereby providing multiple sets of units; wherein each set of units comprises a set of data units and at least one associated set parity unit; wherein the at least one associated set parity unit facilitates a reconstruction of the set of units when a first number of units of the set of units is lost. The multiple sets of units form a group of units.

It is noted that having only a single set parity unit per set can simplify the reconstruction of the set.

The second number can be denoted N2 and the number of set parity units per set can be J. J may range between 1 and N2-1. The number of group parity units may be N2-J. N2-J may range between N2-1 and 1.

Stage 220 may include calculating at least one group parity unit for the group of units. A combination of the at least one group parity unit and at least associated set parity unit of a set of units facilitate a reconstruction of the set of units upon a failure of a second number of units of the set of units. The second number exceeds the first number.

Stage 210 and 220 may be followed by stage 230 of destaging the group of units and the at least one group parity unit to multiple disks of the storage system.

Stage 230 may also be followed by stage 240 of receiving an indication of at least one failed disk of the multiple disks.

Stage 240 may be followed by stage 250 of searching for an affected set of unit, wherein the affected set of units includes at least one lost unit that was stored in a failed disk of the multiple disks.

Stage 250 is followed by stage 260 of reconstructing the affected set of units in response to a number of lost units of the affected set of units.

If more than a single affected set of units exist then stages 250 and 260 are executed per each affected set of units.

The reconstructing includes using at least one of (a) any non-lost set parity unit of the affected set of units and (b) any non-lost group parity unit. If, for example, the number if lost units of the affected set of units exceeds the first number but does not exceed the second number then the reconstruction may be executing all non-lost group parity units and all non-lost set parity units of the attached set of units.

Stage 260 may include stage 262 of reconstructing the affected set of units without processing all the non-lost units of the group and without utilizing the group parity units. In a case where the first number equals one, stage 262 is executed upon a single disk failure.

Stage 262 may include processing only non-lost units of the affected set of units.

Stage 260 may include stage 264 of reconstructing the affected set of units using any non-lost group parity unit and any non-lost set parity unit associated with the affected set of units if the number of lost units of the affected set of units exceeds the first number and does not exceed the second number.

Stage 264 may include processing non-lost units of the entire group of units.

The above explanation referred to two layers of parity calculation—one layer of parity calculation for a set of data units and one layer of parity calculation for a group of units. It is noted that the methods, devices and computer readable medium are not limited to two layers and can be applied to more than two layers.

Figure 3:
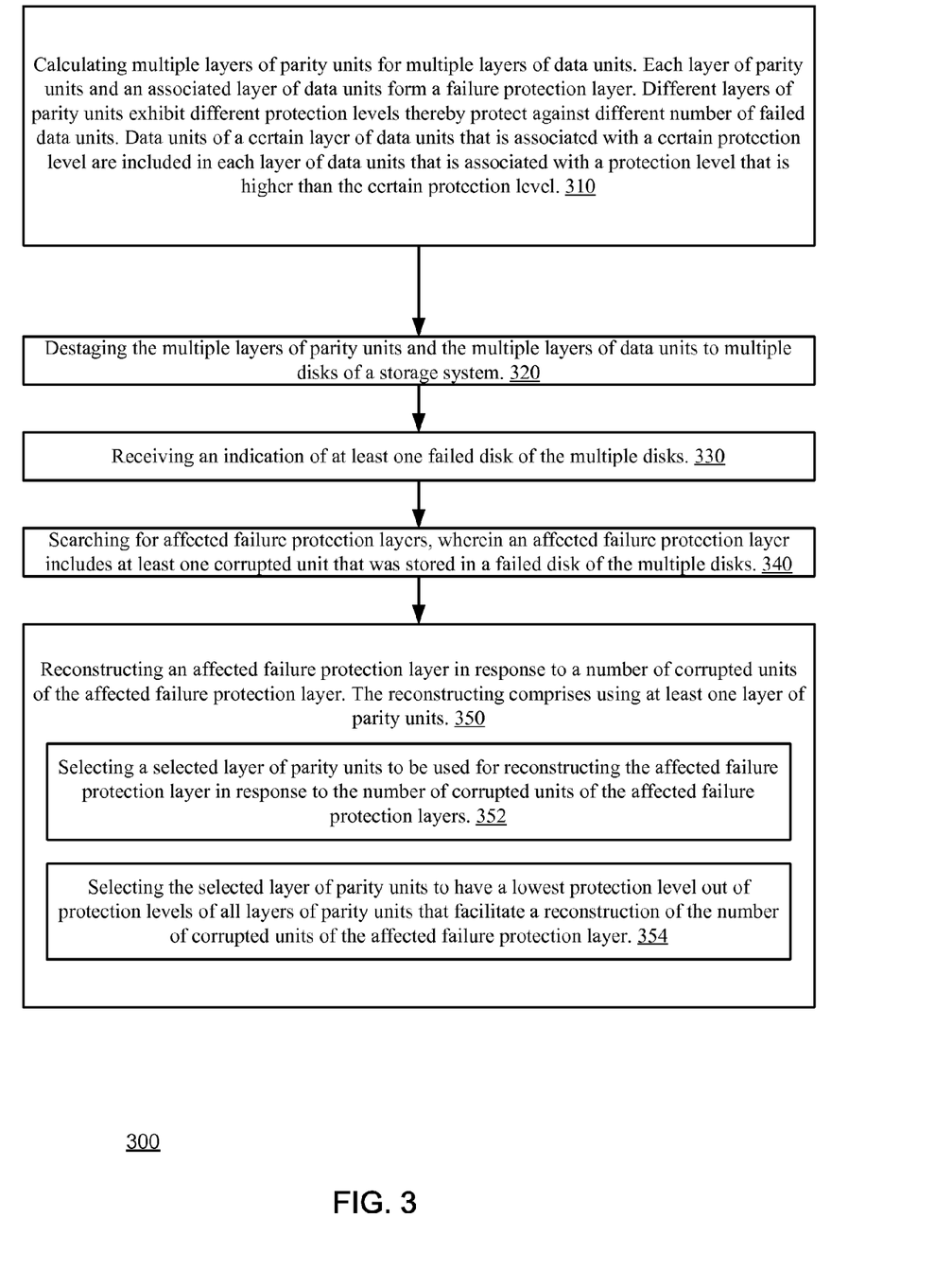
FIG. 3 illustrates a method according to an embodiment of the invention.
Figure 4:
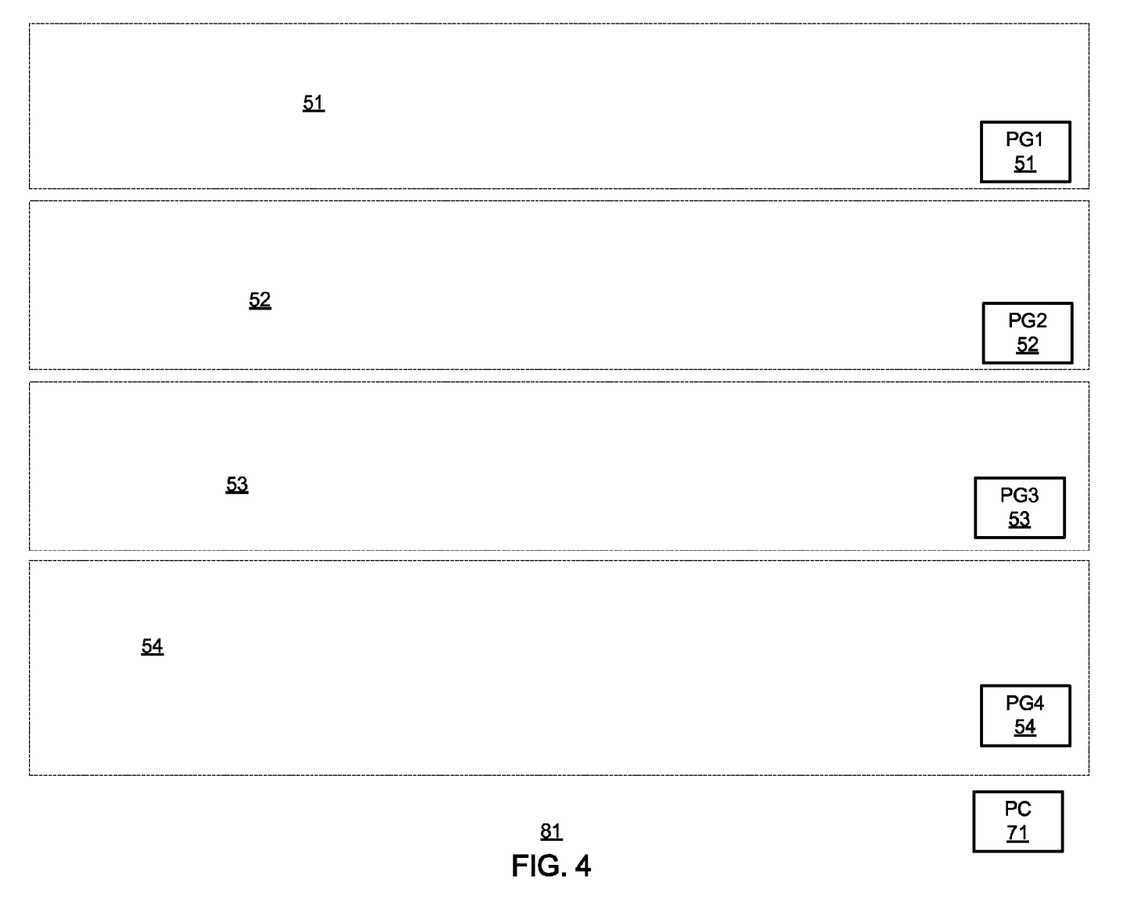
FIG. 4 illustrates data structures according to an embodiment of the invention.

A non-limiting example is provided in FIGS. 3 and 4.

FIG. 3 illustrates method 300 for disk failure protection, according to an embodiment of the invention. FIG. 4 illustrates a combination 81 that include groups 51-54, and a combination parity unit 71 according to an embodiment of the invention.

FIG. 4 illustrates three layers—a first layer is a set (for example, sets 11-14 of FIG. 1 that belong to first group 51), a second layer is a group (for example groups 51-54) and a third layer is the combination.

The first layer of parity units includes set parity units such as set parity units P1-P4 31-34 of FIG. 1. The first layer of data units are the data units of the set—such as data units sets 41-44 of FIG. 1.

The second layer of parity units includes group parity units such as group parity units PG1-PG4 51-54 of FIG. 4. The second layer of data units are the data units of the groups—such as data units of groups 51-54 of FIG. 4. It is noted that the group parity unit can be calculated by processing the entire units of the group (including the set parity units) and in a sense the second layer of data units also includes the set parity units 31-34.

The third layer of parity units includes combination parity unit PC 71 of FIG. 4. The third layer of data units are the data units of the combination 81 of FIG. 4. It is noted that the combination parity unit can be calculated by processing the entire units of the combination (including the group parity units) and in a sense the third layer of data units also includes the group parity units 51-54.

Method 300 may start by stage 310 of calculating multiple layers of parity units for multiple layers of data units. Each layer of parity units and an associated layer of data units form a failure protection layer. Different layers of parity units exhibit different protection levels thereby in conjunction with parities of lower layers protect against different number of failed units. Data units of a certain layer of data units (and corresponding parity units) that is associated with a certain protection level are included in each layer of data units that is associated with a protection level that is higher than the certain protection level.

Stage 310 may be followed by stage 320 of destaging the multiple layers of parity units and the multiple layers of data units to multiple disks of a storage system.

Stage 320 may be followed by stage 310.

Stage 320 may also be followed by stage 330 of receiving an indication of at least one failed disk of the multiple disks.

Stage 330 may be followed by stage 340 of searching for an affected failure protection layer, wherein an affected failure protection layer includes at least one lost unit that was stored in a failed disk of the multiple disks.

Stage 340 may be followed by stage 350 of reconstructing the affected failure protection layer in response to a number of lost units of the affected failure protection layer. The reconstructing may include using any non-lost parity units of that layer.

If more than a single affected failure protection layer is found then stages 330 and 340 are executed for each affected failure protection layer.

Stage 350 may include stage 352 of selecting a selected layer of parity units to be used for reconstructing the affected failure protection layer in response to the number of lost units of the affected failure protection layers.

Stage 352 may include stage 354 of selecting the selected layer of parity units to have a lowest protection level out of protection levels of all layers of parity units that facilitate a reconstruction of the number of lost units of the affected failure protection layer.

Stage 352 may include searching for affected failure protection layers of a lowest protection level. The decision of which layer to apply is responsive to the number of failures per each affected failure protection layers of a lowest protection level.

Stage 350 may also include stage 356 of reconstructing each affected failure protection layer using (a) any non-lost parity unit of a selected layer of parity units associated with that affected failure protection layer and any non-lost parity units of layers of parity units (if such exist) of one or more layers that are lower than the selected layer.

Figure 5:
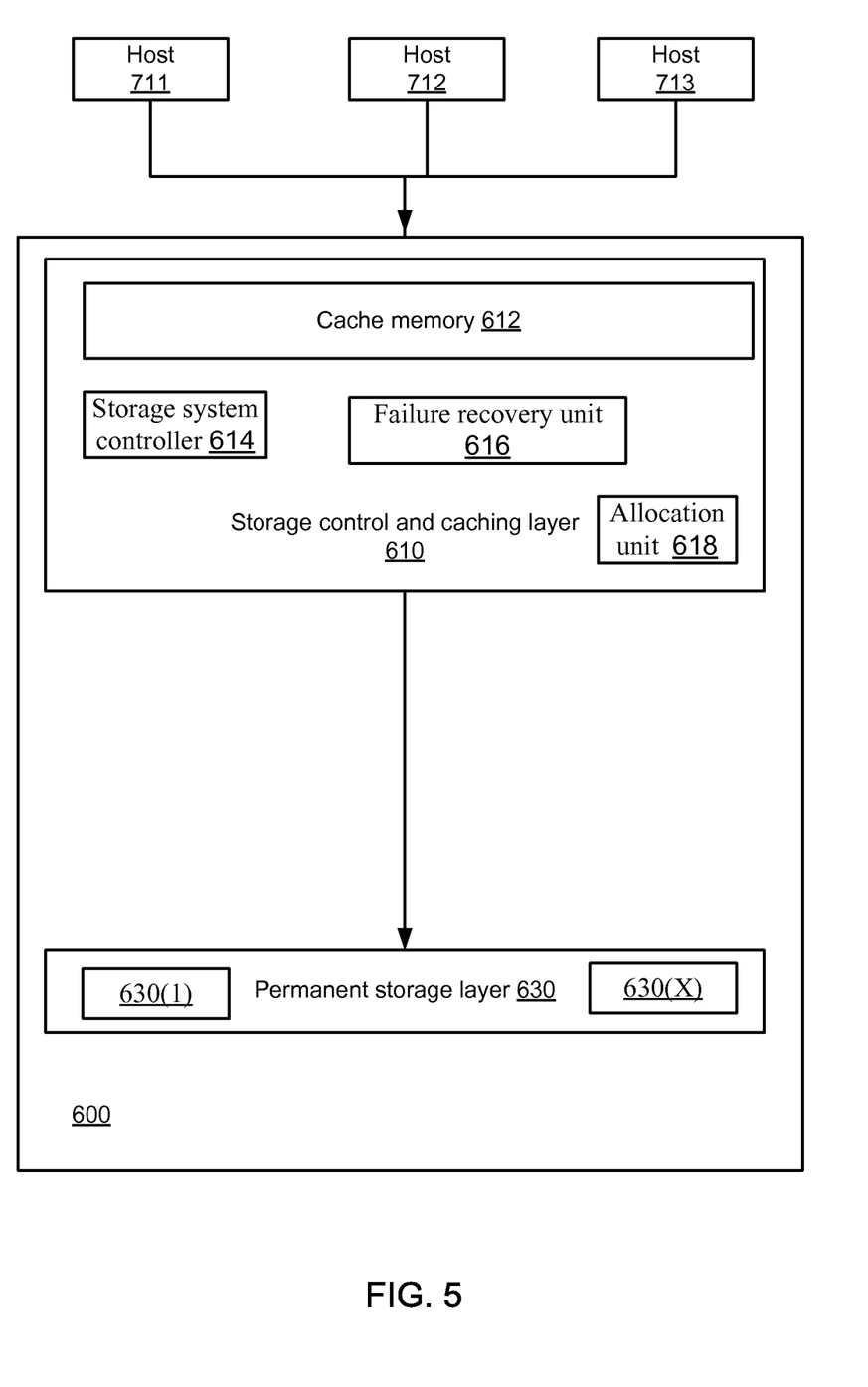
FIG. 5 illustrates a system according to an embodiment of the invention.

FIG. 5 illustrates a storage system 600 according to an embodiment of the invention.

Storage 600 is a mass storage system and may store multiple terabytes-even one petabyte and more. It may include permanent storage layer 630 and storage control and caching layer 610.

System 600 may be accessed by multiple computerized systems such as host computers (denoted "host") 711, 712 and 713 that are coupled to storage system 100 over network 80. The computerized systems 711-713 can read data from the storage system 600 and/or write data to the storage system 600.

The permanent storage layer 630 may include many disks 630(1)-630(X). These many disks may include one or many groups of disks, each group of disks may store sets of data units and parity units. A single disk may store data units and/or parity units associated with different groups of sets of data units.

Storage control and caching layer 610 includes a cache memory 612, a storage system controller 614, a failure recovery unit 616 and an allocation unit 618. The failure recovery unit 616 may be a processor, a computer, a server, it may include a processor, and/or may include one or more hardware components. It may be a general purpose processor and/or dedicated hardware.

The storage system controller 614 controls the operation of different units of the storage system 600.

Data units written to the storage system 600 are first cached. If it is determined to destage a group of sets of data units then the appropriate sets of parity units are calculated (by executing, for example, method 200 and/or 300) before the destage and the group of the data units and its associated sets of parity units are destaged to dynamically allocated disks. The allocation of disks is performed by the allocation unit 618. The calculation of parity units is calculated by the failure recovery unit 616.

The failure recovery unit 616 may also receive an indication that one of more disks failed and recover data. It may execute method 200, method 300 or both. Each of these units can be a computer, a processor and the like.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for disk failure protection, the method comprises:
    calculating multiple set parity units for multiple sets of data units that are cached in a cache memory of a storage system thereby providing a group of units that comprises multiple sets of units; wherein each set of units comprises a set of data units and at least one associated set parity unit; wherein the at least one associated set parity unit facilitates a reconstruction of the set of units when a first number of units of the set of units is lost;
    calculating at least one group parity unit for the group of units;
    wherein a combination of the at least one group parity unit and at least one associated set parity unit of a set of units of the multiple sets of units facilitate a reconstruction of the set of units upon a failure of a second number of units of the set of units;
    wherein the second number of units of the set of units exceeds the first number of units of the set of units;
    destaging the group of units and the at least one group parity unit to multiple disks of the storage system;
    receiving an indication of at least one failed disk of the multiple disks;
    searching for an affected set of units, wherein the affected set of units comprises at least one lost unit that was stored in a failed disk of the at least one failed disk of the multiple disks; and
    reconstructing the affected set of units in response to a number of lost units of the affected set of units.

2. The method according to claim 1 wherein the at least one group parity unit comprises (N2-1) group parity units and wherein N2 equals the second number of units of the set of units.

3. The method according to claim 1 wherein the reconstructing of the affected set of units comprises using at least one of (a) any non-lost set parity unit of the affected set of units and (b) any non-lost group parity unit.

4. The method according to claim 1 wherein the reconstructing of the affected set of units comprises processing either one of (a) all non-lost units of the affected set of units and (b) all non-lost units of the group of units.

5. The method according to claim 1 comprising:
    reconstructing the affected set of units using any non-lost set parity unit of the affected set of units if a number of lost units of the affected set of units does not exceed the first number of units of the set of units; and
    reconstructing the affected set of units using any non-lost group parity unit and any non-lost set parity unit associated with the affected set of units if the number of lost units of the affected set of units exceeds the first number of units of the set of units and does not exceed the second number of units of the set of units.

6. The method according to claim 1 comprising:
    reconstructing the affected set of units by processing all non-lost units of the affected set of units if a number of lost units of the affected set of units does not exceed the first number of units of the set of units; and
    reconstructing the affected set of units by processing all non-lost units of the group of units if the number of lost units of the affected set of units exceeds the first number of units of the set of units and does not exceed the second number of units of the set of units.

7. The method according to claim 1 wherein the destaging comprises storing up to a single unit of the group of units per disk.

8. A non-transitory computer readable medium that stores instructions that once executed by a computer cause the computer to perform the stages of:
    calculating multiple set parity units for multiple sets of data units that are cached in a cache memory of a storage system thereby providing a group of units that comprises multiple sets of units; wherein each set of units comprises a set of data units and at least one associated set parity unit; wherein the at least one associated set parity unit facilitates a reconstruction of the set of units when a first number of units of the set of units is lost;
    calculating at least one group parity unit for the group of units; wherein a combination of the at least one group parity unit and at least one associated set parity unit of a set of units of the multiple sets of units facilitate a reconstruction of the set of units upon a failure of a second number of units of the set of units;

destaging the group of units and the at least one group parity unit to multiple disks of the storage system;

receiving an indication of at least one failed disk of the multiple disks;

searching for an affected set of units, wherein the affected set of units comprises at least one lost unit that was stored in a failed disk of the at least one failed disk of the multiple disks; and reconstructing the affected set of units in response to a number of lost units of the affected set of units.

9. The non-transitory computer readable medium according to claim 8 wherein the at least one group parity unit comprises (N2-1) group parity units and wherein N2 equals the second number of units of the set of units.

10. The non-transitory computer readable medium according to claim 8 wherein the reconstructing of the affected set of units comprises using at least one of (a) any non-lost set parity unit of the affected set of units and (b) any non-lost group parity unit.

11. The non-transitory computer readable medium according to claim 8 wherein the reconstructing of the affected set of units comprises processing either one of (a) all non-lost units of the affected set of units and (b) all non-lost units of the group of units.

12. The non-transitory computer readable medium according to claim 8 that stores instructions for:

reconstructing the affected set of units using any non-lost set parity unit of the affected set of units if a number of lost units of the affected set of units does not exceed the first number of units of the set of units; and reconstructing the affected set of units using any non-lost group parity unit and any non-lost set parity unit associated with the affected set of units if the number of lost units of the affected set of units exceeds the first number of units of the set of units and does not exceed the second number of units of the set of units.

13. The non-transitory computer readable medium according to claim 8 that stores instructions for:

reconstructing the affected set of units by processing all non-lost units of the affected set of units if a number of lost units of the affected set of units does not exceed the first number of units of the set of units; and reconstructing the affected set of units by processing all non-lost units of the group of units if the number of lost units of the affected set of units exceeds the first number of units of the set of units and does not exceed the second number of units of the set of units.

14. The non-transitory computer readable medium according to claim 8 wherein the destaging comprises storing up to a single unit of the group of units per disk.

15. A storage system that comprises a failure recovery unit and a storage system controller;

wherein the failure recovery unit is arranged to:

calculate multiple set parity units for multiple sets of data units that are cached in a cache memory of a storage system thereby providing a group of units that comprises multiple sets of units; wherein each set of units comprises a set of data units and at least one associated set parity unit; wherein the at least one associated set parity unit facilitates a reconstruction of the set of units when a first number of units of the set of units is lost; and calculate at least one group parity unit for the group of units; wherein a combination of the at least one group parity unit and at least one associated set parity unit of a set of units of the multiple sets of units facilitate a reconstruction of the set of units upon a failure of a second number of units of the set of units;

wherein the storage system controller is arranged to destage the group of units and the at least one group parity units to multiple disks of the storage system;

wherein the failure recovery unit is further arranged to:

receive an indication of at least one failed disk of the multiple disks;

search for an affected set of units, wherein the affected set of units comprises at least one lost unit that was stored in a failed disk of the at least one failed disk of the multiple disks; and reconstruct the affected set of units in response to a number of lost units of the affected set of units.

16. The failure recovery system according to claim 15 wherein the at least one group parity units comprises (N2-1) group parity units and wherein N2 equals the second number of units of the set of units.

17. The failure recovery system according to claim 15 wherein a reconstruction of the affected set of units comprises using at least one of (a) any non-lost set parity unit of the affected set of units and (b) any non-lost group parity unit.

18. The failure recovery system according to claim 15 wherein a reconstruction of the affected set of units comprises processing either one of (a) all non-lost units of the affected set of units and (b) all non-lost units of the group of units.

19. The failure recovery system according to claim 15 wherein the failure recovery unit is arranged to:

reconstruct the affected set of units using any non-lost set parity unit of the affected set of units if a number of lost units of the affected set of units does not exceed the first number of units of the set of units; and reconstruct the affected set of units using any non-lost group parity unit and any non-lost set parity unit associated with the affected set of units if the number of lost units of the affected set of units exceeds the first number of units of the set of units and does not exceed the second number of units of the set of units.

20. The failure recovery system according to claim 15 wherein the failure recovery unit is arranged to:

reconstruct the affected set of units by processing all non-lost units of the affected set of units if a number of lost units of the affected set of units does not exceed the first number of units of the set of units; and reconstruct the affected set of units by processing all non-lost units of the group of units if the number of lost units of the affected set of units exceeds the first number of units of the set of units and does not exceed the second number of units of the set of units.

21. The failure recovery system according to claim 15 wherein the destaging comprises storing up to a single unit of the group of units per disk.

22. A method for disk failure protection, the method comprises:

calculating multiple layers of parity units for multiple layers of data units; wherein each layer of parity units and an associated layer of data units form a failure protection layer;

wherein different layers of parity units exhibit different protection levels thereby protect, in conjunction with parity units of lower layers affected by a failure, against different numbers of failed data units;

wherein data units of a certain layer of data units that is associated with a certain protection level are included in each layer of data units that is associated with a protection level that is higher than the certain protection level;

destaging the multiple layers of parity units and of the multiple layers of data units to multiple disks of a storage system;

receiving an indication of at least one failed disk of the multiple disks;

searching for affected failure protection layers, wherein an affected failure protection layer comprises at least one lost unit that was stored in a failed disk of the multiple disks; and reconstructing each affected failure protection layer in response to a number of lost units of the affected failure protection layer;

wherein the reconstructing comprises using at least one layer of parity units.

23. The method according to claim 22, comprising selecting a selected layer of parity units to be used for reconstructing the affected failure protection layer in response to the number of lost units of the affected failure protection layers.

24. The method according to claim 23, wherein the selected layer of parity units has a lowest protection level out of protection levels of all layers of parity units that facilitate a reconstruction of the number of lost units of the affected failure protection layer.

25. The method according to claim 22 comprising searching among the affected failure protection layers for affected failure protection layers of a lowest protection level.

* * * * *